May 17, 1960 E. B. HALES 2,937,330
ALTERNATING CURRENT FUNCTION GENERATOR
Filed Jan. 6, 1958 7 Sheets-Sheet 1

INVENTOR.
EVERETT B. HALES
BY
ATTORNEY.

May 17, 1960  E. B. HALES  2,937,330
ALTERNATING CURRENT FUNCTION GENERATOR
Filed Jan. 6, 1958  7 Sheets-Sheet 2

INVENTOR.
EVERETT B. HALES
BY
ATTORNEY.

May 17, 1960 E. B. HALES 2,937,330
ALTERNATING CURRENT FUNCTION GENERATOR
Filed Jan. 6, 1958 7 Sheets-Sheet 3

INVENTOR.
EVERETT B. HALES
BY
ATTORNEY.

May 17, 1960 E. B. HALES 2,937,330
ALTERNATING CURRENT FUNCTION GENERATOR
Filed Jan. 6, 1958 7 Sheets-Sheet 4
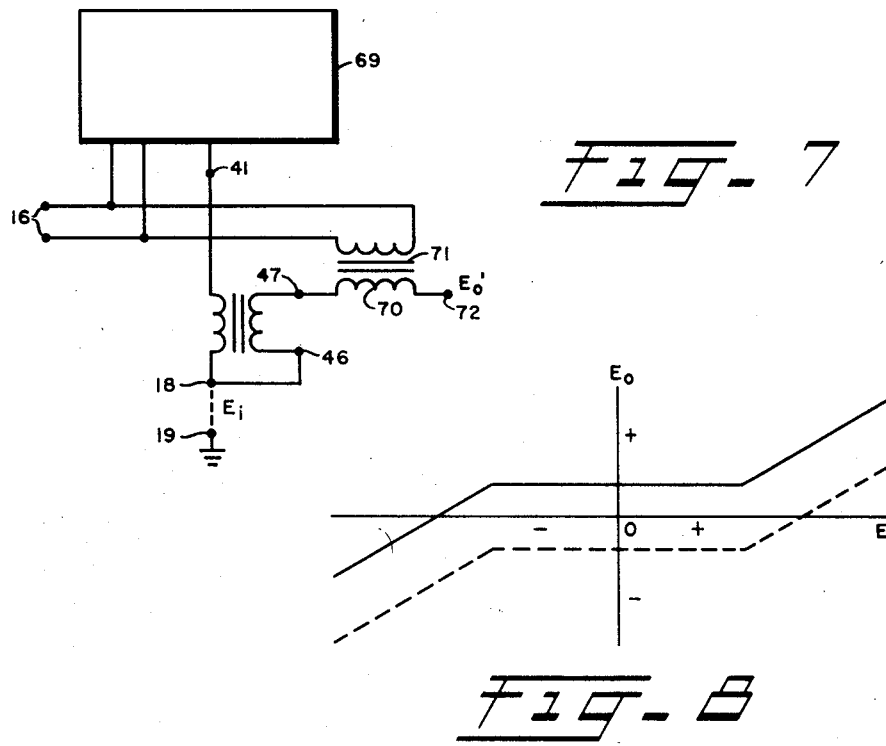
Fig. 7
Fig. 8
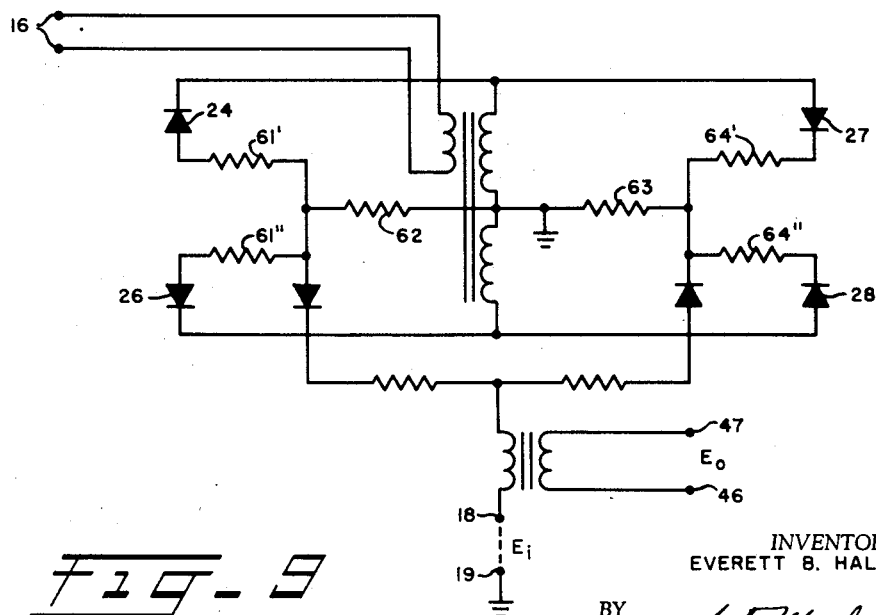
Fig. 9
INVENTOR.
EVERETT B. HALES
BY
ATTORNEY.

May 17, 1960  E. B. HALES  2,937,330
ALTERNATING CURRENT FUNCTION GENERATOR
Filed Jan. 6, 1958  7 Sheets-Sheet 5
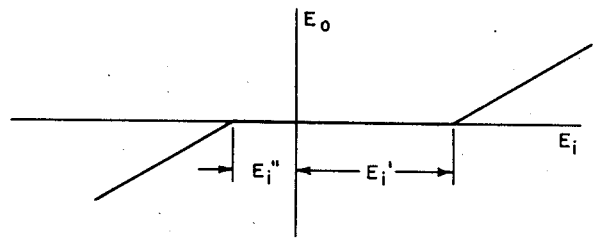
Fig-10
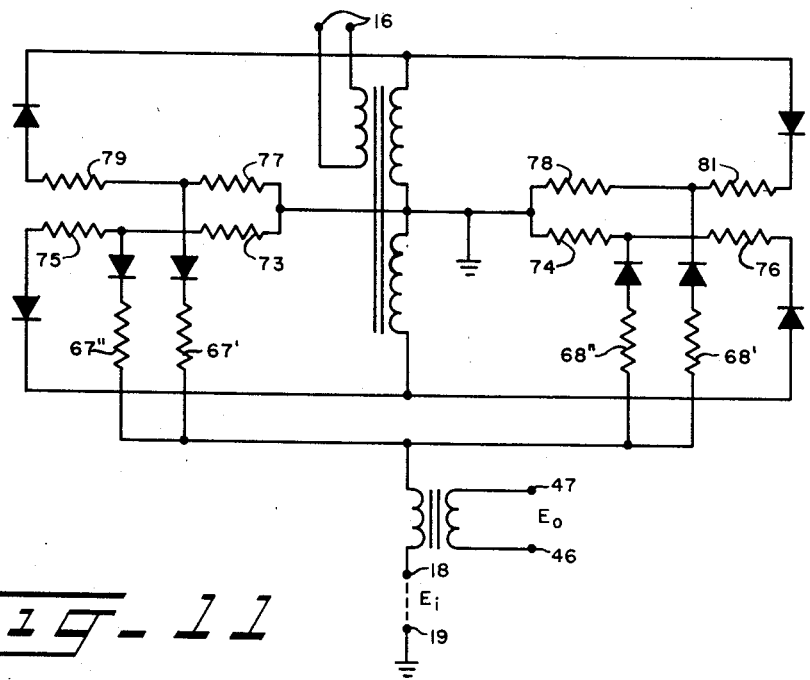
Fig-11
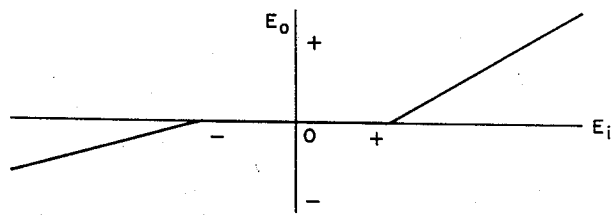
Fig-12
INVENTOR.
EVERETT B. HALES
BY 
ATTORNEY.

May 17, 1960 E. B. HALES 2,937,330
ALTERNATING CURRENT FUNCTION GENERATOR
Filed Jan. 6, 1958 7 Sheets-Sheet 6

INVENTOR.
EVERETT B. HALES
BY
ATTORNEY.

May 17, 1960  E. B. HALES  2,937,330
ALTERNATING CURRENT FUNCTION GENERATOR
Filed Jan. 6, 1958  7 Sheets-Sheet 7
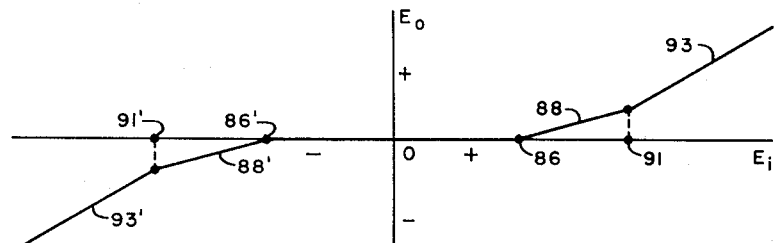
*Fig_14*
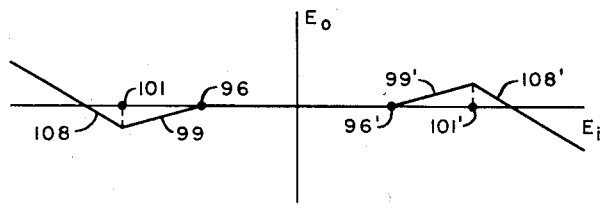
*Fig_16*
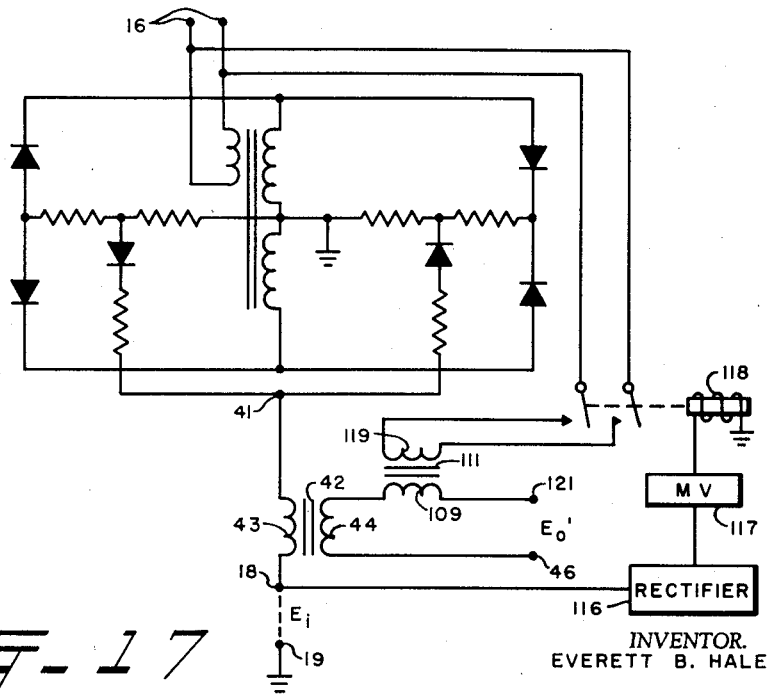
*Fig_17*
INVENTOR.
EVERETT B. HALES
BY
ATTORNEY.

United States Patent Office 2,937,330
Patented May 17, 1960

2,937,330
ALTERNATING CURRENT FUNCTION GENERATOR

Everett B. Hales, Hawthorne, N.Y., assignor to General Precision, Inc., a corporation of Delaware Application January 6, 1958, Serial No. 707,210

6 Claims. (Cl. 322—36)

This invention relates to alternating current generators having an output voltage which varies in accordance with a selected arbitrary mathematical function of an independent variable alternating voltage.

This invention provides a function generator which is capable of synthesizing an approximation over a suitable finite range of any real mathematical function of a single independent variable which can be represented by a finite number of straight segments. The functions which can be approximated may be symmetrical or asymmetrical, may have positive or negative slopes, and may be continuous or discontinuous.

The function generator of this invention generates arbitrary geometrical functions which ideally consist of straight segments. In practice the angles at junctions of these segments are somewhat blunted to form short curves. The generator output is limited to this form and smooth curves cannot be generated, so to this extent nearly all of the useful functions which it is possible to generate are only approximated. However, approximate functions are suitable for many purposes such as that which is selected for detailed description, namely, the correction of a small non-linearity of output of an instrument tachometer.

One reason that an approximate correction may be satisfactory is that the generated function is applied not as a multiplying correction but as an additive correction. It is generated by means having no moving components and hence no mechanical inertia, the circuit is simple and highly flexible, and does not generate spurious harmonics.

An instrument tachometer generates an alternating potential at line frequency, the output potential being ideally exactly proportional to the speed at which the tachometer is driven. Although the linearity error of a fine instrument tachometer may be no more than 0.15%, even this small error is too large to be tolerated in some cases. It is in the substantially complete elimination of this error that the instant invention finds one use. The invention is superior when so employed to previous direct methods of eliminating such errors which required the generation of a correction function from the output of the tachometer itself with an accuracy in the correction device at least as high as the tachometer accuracy.

The present invention provides a device which consists of two or more elements. One may be a terminal or pair of terminals on which appears the independent variable voltage constituting the input to the device. When the device is used in association with a tachometer the output terminals of the latter provide this independent voltage. The second element of the device of the invention senses the independent voltage and at selected voltage levels controls the amplitude of one or more alternating correction currents. The third element combines these currents and transforms them into alternating voltages. In the tachometer example these voltages are finally inserted in series with the tachometer voltage to produce a corrected output summation voltage which can be made almost exactly linear with tachometer speed.

The general purpose of this invention is to provide an arbitrary function generator.

More exactly the purpose of this invention is to provide a generator of mathematical functions of an independent alternating voltage, each mathematical function being represented by a graph composed of straight segments joined by short arcs and approximating a function represented by a smooth curve, the generator output being a voltage magnitude which is synchronous and in phase with the input voltage.

A further understanding of this invention may be secured from the detailed description and associated drawings, in which:

Figures 4, 8, 10, 12, 14, 16 and 18 depict a variety of types of voltage functions which can be generated by the circuit of the invention.

Figures 7 and 9 depict circuits for shifting coordinate axes.

Figures 11 and 15 depict circuits for controlling the slopes of the characteristic segments.

Figure 17 depicts a circuit for generating discontinuous functions.

Figure 1:
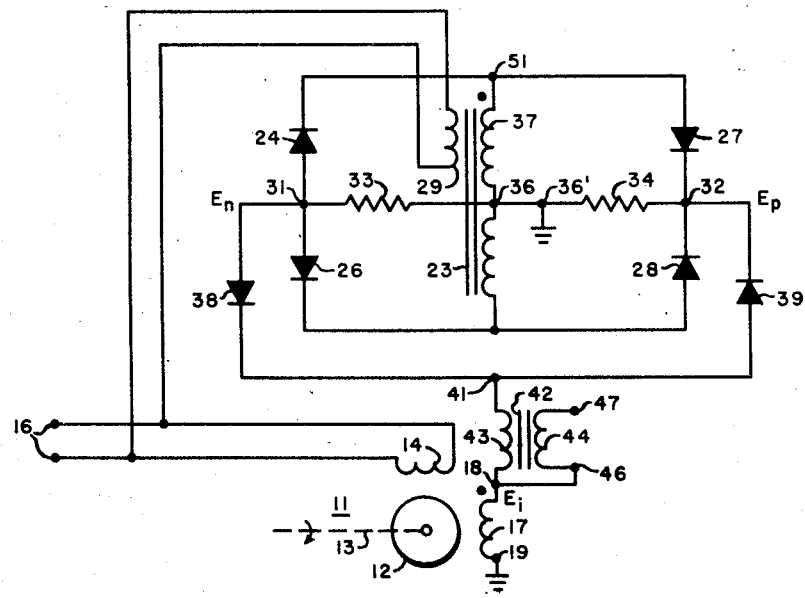
Figure 1 depicts the basic circuit of the invention.
Figure 2:
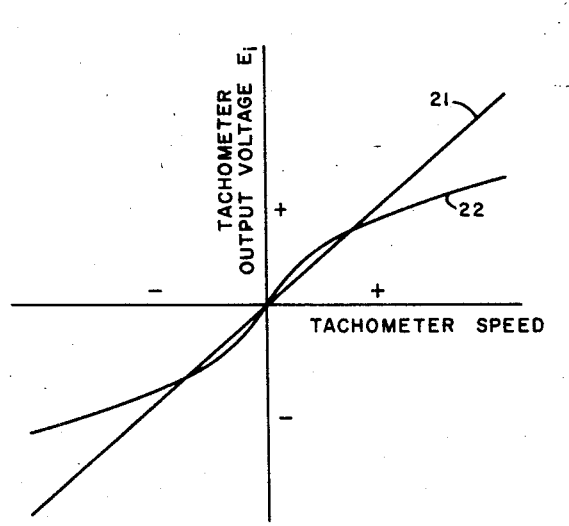
Figure 2 is a tachometer characteristic curve of speed versus generated alternating voltage, reversed phase output generated at negative speed being characterized by a minus sign.

Referring now to Fig. 1, an instrument tachometer 11 is chosen as the source of independently variable input voltage which is to be applied to the function generator of this invention and as the device whose function is to be corrected by the function generator. The tachometer 11 has a rotor 12 driven by shaft 13 at a speed which constitutes its input data. The tachometer 11 has a winding 14 which is energized by 400 c.p.s. power applied to terminals 16 and also has an output winding 17. 400 c.p.s. voltage at winding 17 terminals 18 and 19 constitutes the tachometer output voltage $E_t$ and ideally has a magnitude which is strictly proportional to input speed, shown graphically by straight line 21, Fig. 2. Actually tachometer output never reaches this ideal but has a typical non-linearity shown by curve 22 wherein the non-linearity is exaggerated for clarity of illustration. Although departure from linearity by a good tachometer will perhaps not exceed 0.15% nevertheless in some applications this is an excessive error which can not be tolerated. It is the function of the device of the invention in this application to reduce this error nearly to zero by simple means.

The device of this invention includes a rectifying circuit composed of a transformer 23, Fig. 1, and rectifying diodes 24, 26, 27, 28 having the input derived from terminals 16 applied to the transformer primary winding 29 while a direct-current output potential is generated between terminals 31 and 32. This circuit so far is a conventional full-wave bridge rectifying circuit. All of the diodes in this circuit may be of any type but for instrument use are preferably of the semi-conductor type. The direct-current terminals 31 and 32 are bridged with two equal resistors 33 and 34 with their midpoint 36 connected to the midpoint of the transformer secondary winding 37 and also grounded. It is to be understood, however, that the ground connection here and elsewhere merely symbolizes connection to a common voltage datum source. The connections 36 and 36' change the full-wave rectifier into two half-wave rectifiers and provide the flexibility necessary to generate asymmetrical functions. Two limit diodes 38 and 39 are connected between the direct-current terminals 31 and 32 and a voltage limit terminal 41. It is essential that these limit diodes 38 and 39, and all limit diodes in all embodiments of this invention, be poled as indicated so as to be non-conductive to the rectified direct potentials of the rectifier terminals to which they are connected.

An output transformer 42 has its primary winding 43 connected between tachometer output terminal 18 and voltage limit terminal 41. The secondary winding 44 is provided with terminals 46 and 47 which constitute the output terminals of the function generator of this invention. When the function generator is used to correct a tachometer output as in this example, the function generator output is added in series with the tachometer output. This is accomplished by connecting terminals 46 and 18 together, so that the tachometer output and the function generator are connected in series, and the sum output voltage, which is the corrected tachometer voltage, is secured between terminals 47 and 19. The degree of tachometer correction can be controlled by selection of the transformer ratio.

Figure 3:
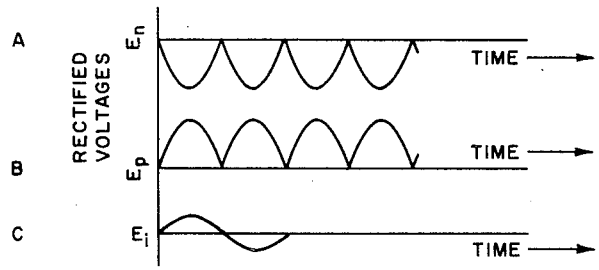
Figure 3 illustrates voltages at several points in the circuit of Fig. 1.

In the operation of the circuit of Fig. 1, unsmoothed sinusoidal half-cycles of potential appear as interrupted negative direct potential at rectifier terminal 31 as indicated in Fig. 3, graph A. Similarly positive direct potential as depicted in graph B appears at terminal 32. In the branch including diodes 38 and 39 and terminal 41 the diodes 38 and 39 are poled to prevent current flow due to these potentials.

The potential $E_i$ relative to ground generated by the tachometer, constituting the function generator input potential, is developed at terminal 18. When this potential $E_i$ is zero no current flows in transformer primary winding 43. When $E_i$ has any value less than the direct potentials $E_n$ and $E_p$ at rectifier terminals 31 and 32 as depicted in graphs A, B and C of Fig. 3, no current can flow. During the first or positive half cycle of $E_i$, graph C, current cannot flow through diode 38 because of diode polarity, and current cannot flow through diode 39 because $E_i$ is less than $E_p$ during all parts of the half cycle. Similarly during the second or negative half cycle of $E_i$ the reversed diode 39 prevents current flow, and the larger $E_n$ potential prevents current flow through diode 38. However, if $E_i$ be increased until exactly equal to $E_p$ and $E_n$ it tends to make both diodes 39 and 38 conductive. When $E_i$ is any amount larger than $E_p$ and $E_n$, neglecting diode contact potential, then current I flows during all parts of both half cycles in amount depending on the impedance to ground through all parts of the rectifier bridges presented to voltage limit terminal 41 and depending on the difference between $E_i$ and $E_p$ or $E_n$. This relation between $E_i$ and I is shown in Fig. 4.

Figure 4:
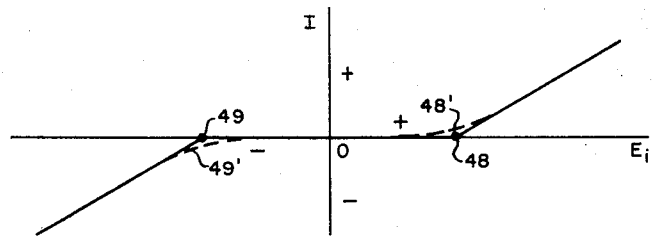

The points 48 and 49, Fig. 4, at which corrective voltages begin to be generated are indicated as sharp angles. However, since diodes 38 and 39, Fig. 1, are not ideal valves but change their resistances gradually when changing from their non-conductive to conductive condition, the curves of Fig. 4 are actually not angular but have the rounded forms indicated by the dotted sections 48′ and 49′. This action occurs in all embodiments of this function generator, so that the mathematical functions which it generates approach smooth curves to a degree, rather than being made up of a series of straight segments meeting at sharp angles. Thus this "imperfection," or departure from ideal valve action, actually improves the action of this circuit in most applications.

It is noted that during each half cycle the sinusoidal potential $E_i$ opposes sinusoidal potential $E_p$ or $E_n$, and that the difference is the potential which causes current flow, and therefore is also sinusoidal. The instant discussion assumes that the potential $E_i$ and potential $E_p$ or $E_n$, when opposed at diode 38 or 39 are in exact phase opposition, which in practice is approached closely enough for all practical purposes.

When bridge junction 51 is positive at the same time that input terminal 18 is positive, then if currtnt flows it must all flow through diode 27 during the positive half cycle of $E_i$ and through diode 24 during the negative half cycle of $E_i$. This polarity condition is indicated by a dot near junction 51 and a dot near terminal 18. This polarization is conventionalized in Fig. 4 by considering $E_i$ to be "positive" to the right of the zero origin and "negative" to the left, also by considering that upward current flow in winding 43 during the positive half cycle of $E_i$ is positive, characterized by + and − on the ordinate I axis. The right branch of Fig. 4, according to these conventions is drawn when the coil polarizations are as shown by the dots. If the polarization of terminal 18 be reversed, which is effected by reversing the direction of rotation of the tachometer, then inspection shows that all current flows through diodes 26 and 28 and none through diodes 24 and 27, generating the left branch of Fig. 4.

The points 48 and 49, representing equality of $E_i$ with $E_p$ and $E_n$, must be equidistant from the origin since in this circuit $E_p$ and $E_n$ must be equal. The slopes of the slanting branches represent the impedances meeting $E_i$ and in this symmetrical circuit must be the same in the branches including diodes 24 and 27 as in the branches including diodes 26 and 28. Fig. 4 is therefore symmetrical about both axes.

In any specific transformer 42 having a definite secondary load the potential across the primary winding 43 bears a definite relation to the current through it, as does the output potential $E_o$ of secondary winding 44 at the terminals 46—47. Therefore, in the above discussion and in Fig. 4, $E_o$ may be substituted for I. The value of $E_o$, of course, depends on the value of I multiplied by the voltage ratio of the transformer.

Figure 5:
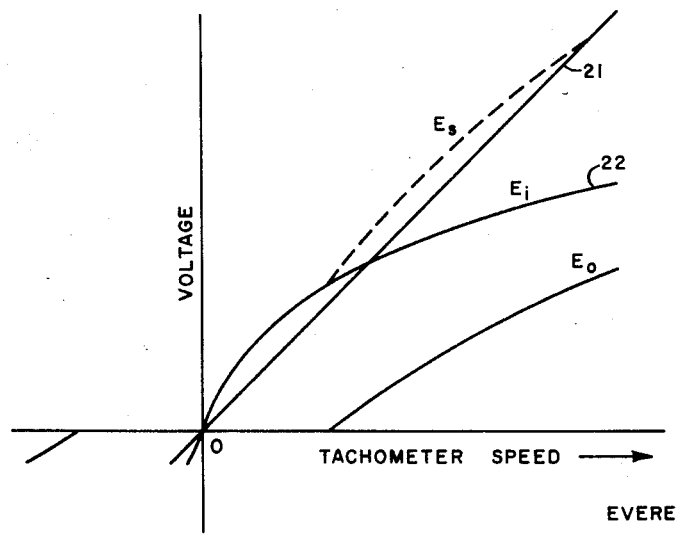
Figure 5 depicts the manner in which tachometer output may be linearized by the function generator.

In accordance with the present example employing the function generator output to linearize the tachometer output, terminal 46, Fig. 1, is connected to terminal 18 and the corrected or linearized output $E_s$ is secured between terminals 47 and 19. The sum of $E_i$ and $E_o$, namely $E_s$, is graphically shown in Fig. 5. The curve $E_i$ is a replot of the right side of curve 22, Fig. 2. The curve $E_o$ is a replot of the right side of Fig. 4 to speed abscissae and voltage ordinates. Although $E_s$ shows a continuous error in Fig. 5, it is much less than that of $E_i$, and if the ideal line 21 be shifted in angle, representing change in instrument calibration, the curve $E_s$ will represent still less error. The left branches of these curves are symmetrical.

In order to add the correction voltage $E_o$ to the tachometer voltage $E_i$ they should be in the same or opposing phase, and this condition is approached closely enough for all practical purposes.

Figure 6:
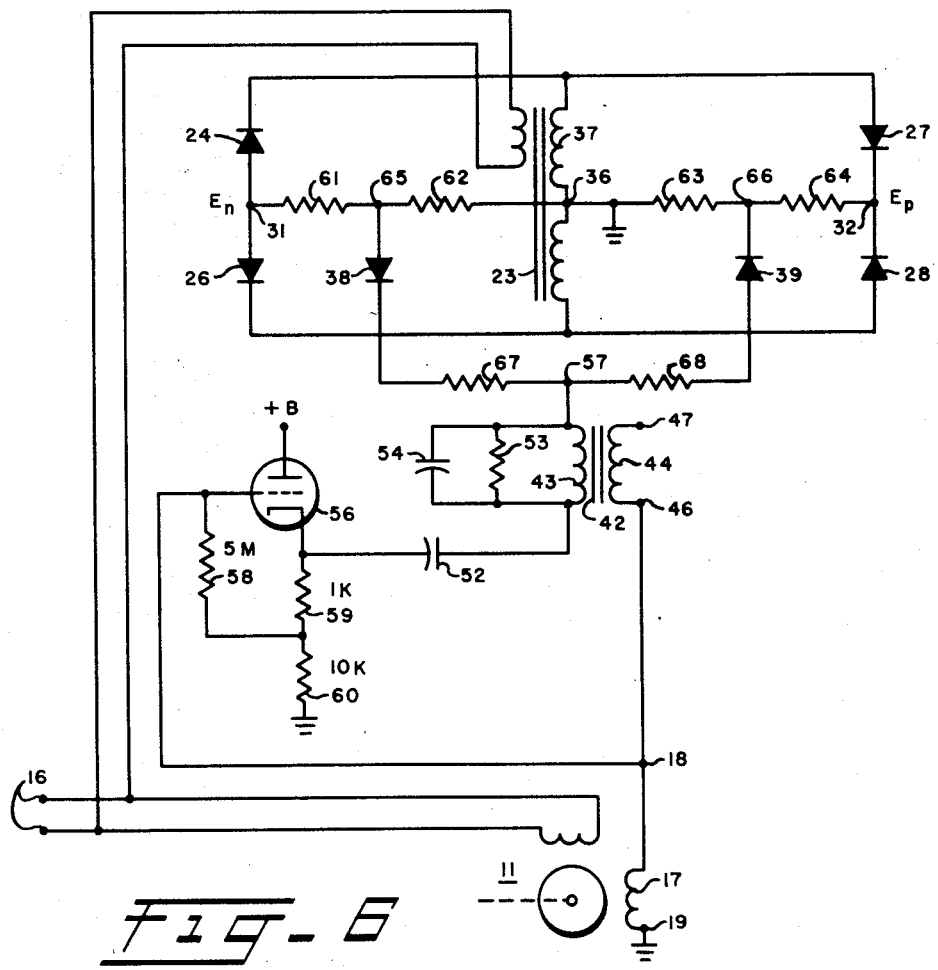
Figure 6 depicts an improved basic circuit.

In Fig. 6 there are shown several circuit refinements which are desirable to increase accuracy. In this figure the basic rectifier of Fig. 1 is redrawn including transformer 23 and rectifying bridge diodes 24, 26, 27 and 28. The common terminal 31 of the diodes 24 and 26 is connected through a pair of series resistors 61 and 62 to the midterminal 36 of the transformer secondary 37, while the common terminal 32 of the diodes 27 and 28 is similarly connected through a pair of series resistors 63 and 64. For reasons as will appear more fully hereinafter, the diode 38 is connected to the common terminal 65 of the resistors 61 and 62 while the diode 39 is connected to the common terminal 66 of the resistors 63 and 64. The first refinement consists of an arrangement to shift the phase of output potential $E_o$ at terminals 46 and 47 to neutralize phase shift due to inductance of transformer 42. This is accomplished by shunting the primary winding 43 by a resistor 53, or by a capacitor 54, or by both, thus phase shifting or "tuning" the transformer and its output voltage.

When accuracy is required of tachometers it is necessary to connect them only to loads having a very high impedance, to eliminate tachometer internal voltage drop. The bridge circuit of the invention has a relatively low impedance so that it is highly desirable to employ a cathode follower 56 to interconnect the tachometer terminal 18 and the voltage limit terminal 57. The cathode follower 56 is provided with a 5 megohm grid resistor 58 having one end connected to the intermediate terminal of an eleven-to-one cathode voltage divider 59—60, so that the input impedance is about 50 megohms. The output impedance is low and the negative gain is a factor in the instrument calibration. The output of the cathode follower 56 is coupled to the bridge circuit through any suitable alternating current circuit as for example the capacitor 52.

Accuracy demands that the potential across the transformer secondary winding 37 be kept constant and not changed with changes in load. It is therefore desirable that resistors 61, 62, 63 and 64 have a low value so as to load the transformer 23 heavily, swamping out variations due to opening and closing of diodes 38 and 39. The limit diodes 38 and 39 are connected to resistor 20 intermediate taps 65 and 66 instead of the junctions 31 and 32 to facilitate the design control of the voltage points 48 and 49, Fig. 4, at which the characteristics begin to change.

The slopes of the characteristic curve of Fig. 4 depend on the impedances between terminal 57, Fig. 6, and ground within the rectifier bridge. These impedances are controlled by inserting resistors 67 and 68 in the conductors interconnecting the limit diodes 38 and 39 and the voltage limit junction 57. The two branches consisting of resistor 67 and diode 38, and resistor 68 and diode 39 may be said to compose a voltage limit circuit. Resistors 67 and 68 must be equal, and in fact this entire bridge circuit must be symmetrical to preserve equal positive and negative half-cycle currents in winding 43.

A vertical shift of the coordinate axes of Fig. 4 is accomplished merely by inserting an alternating current bias in series with the output. This is accomplished as depicted in Fig. 7, in which the rectangle 69 represents the rectifier of Fig. 1 and the input voltage $E_i$ is generalized as being any input voltage however derived and not necessarily derived from a tachometer. However, the input voltage $E_i$ must be in phase with or exactly opposed in phase to that applied from terminals 16 to the rectifier 69.

The output voltage across terminals 46—47 is connected in series with the in phase or opposed phase voltage of secondary winding 70 of a transformer 71, shown as derived from terminals 16, producing a voltage $E_o'$ across terminals 46—72.

If the voltage existing across the terminals 46—47 is biased by a voltage in phase therewith derived from the secondary 70 of the transformer 71, the circuit characteristic will be displaced upwardly as respects the axis as illustrated by the solid line in Fig. 8. On the other hand if the biasing voltage obtained from the secondary 70 is opposed in phase to that appearing across terminals 46—47 the circuit characteristic will be displaced downwardly as illustrated by the dashed line in Fig. 8.

The output is coordinate-shifted horizontally by employing the rectifier network of Fig. 9, in which the resistors 61' and 61'' have different values and 64' and 64'' have different values. The resistances 61', 61'' and 62 have the same values as 64', 64'' and 63 respectively. The output voltage characteristic is as depicted in Fig. 10, $E_i'$ and $E_i''$ being different.

As asymmetric characteristic curve having different slopets for positive and negative input voltages, corresponding to forward and reverse speeds of a tachometer employed to generate the input voltage, is secured by employing the circuit of Fig. 11, in which the resistance of resistor 67' differs from that of resistor 67'' and 68' from 68''. Resistances 67' and 68' should have the same value, as should the resistors 67'' and 68'', resistors 73 and 74, resistors 75 and 76, resistors 77 and 78, and resistors 79 and 81. A characteristic curve having asymmetrical slopes derived from such a circuit is depicted in Fig. 12.

Figure 13:
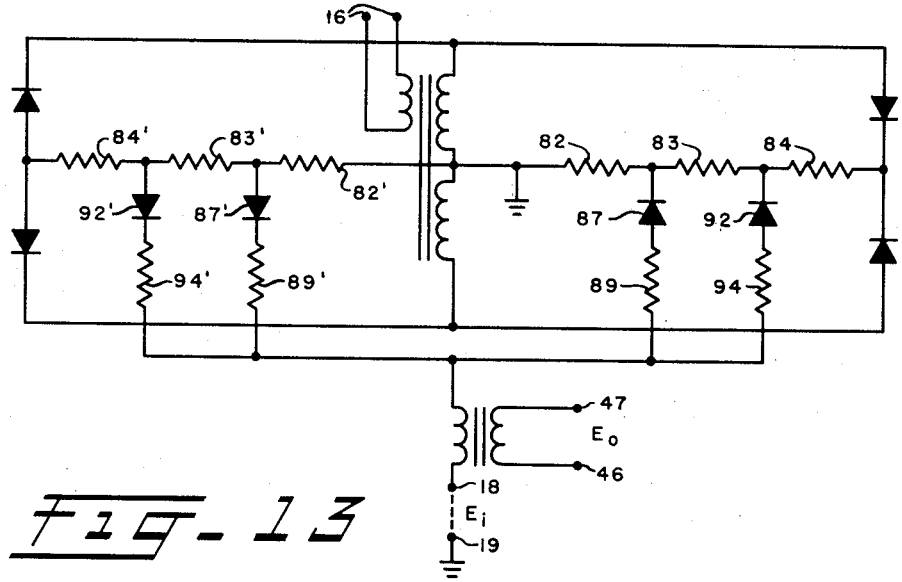
Figure 13 depicts a circuit which may be used to generate a function composed of any number of straight segments.

A characteristic curve having two or more changes of slope in each branch is secured by tapping each of the two bleeder resistances at two or more points. The circuit for such an arrangement is shown in Fig. 13 and the characteristic curve thereof in Fig. 14. This circuit also should be symmetrical, like-numbered resistors having the same resistances. As $E_i$ increases, the points of departure or angle change 86 and 86', Fig. 14, indicate the values of $E_i$ at which the diodes 87 and 87' become conductive, the slopes of lines 88 and 88' being determined by the equal resistances 89—89'. When $E_i$ attains the values indicated at 91 and 91', Fig. 14, the diodes 92 and 92' become conductive, and thereafter the slopes of the segments 93 and 93' are determined by the values of equal resistors 94 and 94'.

Figure 13 generates the function shown in Fig. 14 having four bends or angle changes. However, by providing more bleeder taps and more voltage limit diode circuits connected thereto in the same manner, functions having more bends may be generated. By using a large number of such taps and circuits functions having a large number of bends joining a large number of segments may be generated. This procedure, and the fact that the use of diodes blunts the sharp bends into short arcs, permit this invention to be applied to the approximation of smooth functions as closely as may be desired.

Figure 15:
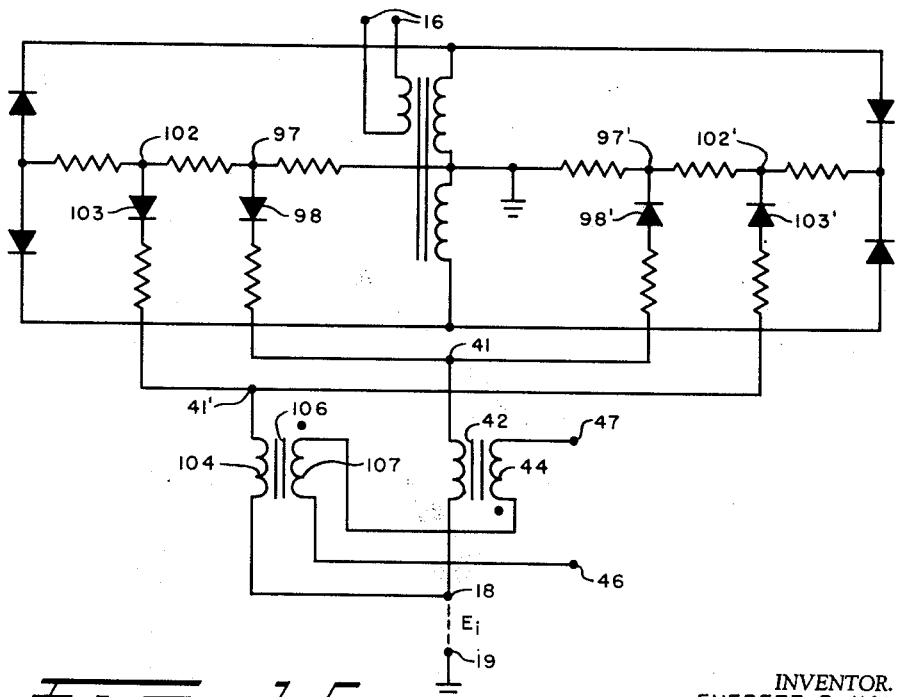

So far all of the curves generated have had positive slopes. The circuit of Fig. 15 gives the characteristic of Fig. 16 having both positive and negative slopes. As the input voltage $E_i$ increases to point 96 or 96', Fig. 16, where it equals the bleeder voltages at junctions 97 and 97', the diodes 98 and 98' become conductive. As the voltage $E_i$ continues to rise the segments 99 and 99', Fig. 16 are drawn. When $E_i$ has the value of point 101 or 101', equalling the voltages at equal bleeder points 102 and 102', diodes 103 and 103' become conductive, applying current through a second voltage level junction 41' to the primary winding 104 of a second output transformer 106. The secondary winding 107 is in series with the secondary winding 44 and in opposed phase, and the transformer ratios and resistor values are such that the voltage of winding 107 increases faster than the voltage of winding 44. The segments 108, 108', Fig. 16, of the characteristic curve are thus drawn.

Figure 18:
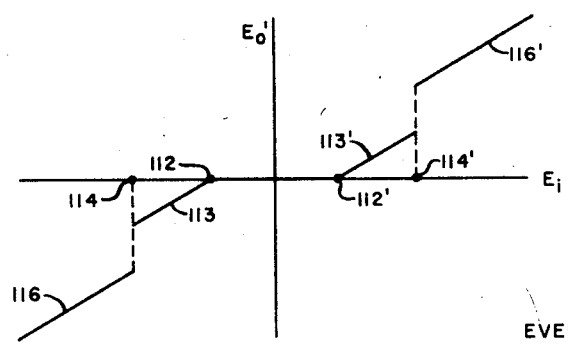

A discontinuous function is generated by the circuit of Fig. 17, in which the output secondary winding 44 of transformer 42 is placed in series with the secondary winding 109 of another transformer 111. As $E_i$ increases, at the value 112 or 112', Fig. 18, a voltage is generated by winding 44, Fig. 17, having the slopes of segments 113, 113', Fig. 18. When $E_i$ has the value at 114 or 114', this alternating voltage secured from terminal 18 Fig. 17 is rectified in rectifier 116 and is applied to change a bistable multivibrator 117 to its alternate condition, operating relay 118. This relay applies alternating current from power terminals 16 to the primary winding 119 of transformer 111, thus introducing an alternating current bias in phase or in opposed phase into the output $E_o'$ at terminals 121—46. This is indicated in Fig. 18 by the output voltage steps or discontinuities at abscissa points 114 and 114'. With increasing input voltage $E_i$ the characteristic continues to rise as indicated by 116 and 116'.

As will be apparent from the above, the function generator of this invention may, by suitable use of circuit elements and configurations, be made to generate a large number of different functions as the occasion may demand.

What is claimed is:

1. An alternating current function generator comprising, a source of alternating current, a full wave rectifier bridge circuit energized thereby, a series resistor network connected between conjugate terminals of said bridge network and having a midterminal connected to a terminal of reference potential, a voltage limiting circuit including at least a pair of rectifiers connected in series between selected terminals of said resistor network on opposite sides of said midterminal, said rectifiers being so poled as to be non-conductive in the direction of the potential applied by said resistor network, a source of alternating current signal, and means for deriving a functional signal connected between said source of alternating current signal and the common terminal of said rectifiers.

2. An alternating current function generator comprising, a transformer having its primary energized by a source of alternating current and its secondary connected between conjugate terminals of a four arm bridge rectifier circuit, a resistor network interconnecting the remaining conjugate terminals of said bridge rectifier circuit, the midterminal of said resistor network being connected to the midterminal of said transformer secondary and to a terminal of reference potential, a voltage limiting circuit bridging at least a portion of said resistor network extending on each side of the midterminal thereof, said limiting circuit including at least a pair of branch arms each of which includes a unidirectional conductive device poled to oppose current flow as a result of the potential applied thereto by said resistor network, said branch arms being connected together at their ends remote from said resistor network, and a source of alternating current signal and means for deriving a functional signal connected in series between said terminal of reference potential and the common terminal of said branch arms.

3. An alternating current function generator comprising, a transformer having its primary energized by a source of alternating current and its secondary connected between conjugate terminals of a four arm bridge rectifier circuit, a resistor network interconnecting the remaining conjugate terminals of said bridge rectifier circuit, the midterminal of said resistor network being connected to the midterminal of said transformer secondary and to a terminal of reference potential, a voltage limiting circuit bridging at least a portion of said resistor network extending on each side of the midterminal thereof, said limiting circuit including at least a pair of branch arms each of which includes a unidirectional conductive device poled to be non-conductive in the direction of the potential applied thereto by said resistor network, said branch arms being connected together at their ends remote from said resistor network, a source of alternating current having a terminal thereof connected to said reference terminal and the opposite terminal thereof connected through the primary of a transformer to the common terminal of said branch arms, and means for deriving a functional signal from the secondary of said last-mentioned transformer.

4. An alternating current function generator comprising, a transformer having its primary energized by a source of alternating current and its secondary connected between conjugate terminals of a four arm bridge rectifier circuit, a resistor network interconnecting the remaining conjugate terminals of said bridge rectifier circuit, the midterminal of said resistor network being connected to the midterminal of said transformer secondary and to a terminal of reference potential, a first voltage limiting circuit including a pair of serially connected unidirectional conductive devices each of which is connected to intermediate terminals of said resistor network on opposite sides of the midterminal thereof, a second voltage limiting circuit including a pair of serially connected unidirectional conductive devices each of which is connected to other intermediate terminals of said resistor network on opposite sides of the midterminal thereof, all of said unidirectional conductive devices being poled to be non-conductive in the direction of the potential applied thereto by said resistor network, a source of alternating current having a terminal thereof connected to said reference terminal and another terminal thereof connected through transformer means to the terminals of said unidirectional conductive devices remote from said resistor network.

5. An alternating current function generator comprising, a transformer having its primary energized by a source of alternating current and its secondary connected between conjugate terminals of a four arm bridge rectifier circuit, a resistor network interconnecting the remaining conjugate terminals of said bridge rectifier circuit, the midterminal of said resistor network being connected to the midterminal of said transformer secondary and to a terminal of reference potential, a first pair of unidirectional conductive devices having respective terminals thereof connected to selected intermediate terminals of said resistor network on opposite sides of the midterminal thereof, a second pair of unidirectional conductive devices having respective terminals thereof connected to other selected intermediate terminals of said resistor network on opposite sides of the midterminal thereof, said unidirectional conductive devices being poled to be non-conductive in the direction of the potential applied thereto by said resistor network and having their terminals remote from said resistor network connected to a common junction, a source of alternating current having a terminal thereof connected to said reference terminal and the opposite terminal thereof connected through the primary of a transformer to said common junction, and means for deriving a functional signal from said last mentioned transformer.

6. An alternating current function generator comprising, a transformer having its primary energized by a source of alternating current and its secondary connected between conjugate terminals of a four arm bridge rectifier circuit, a resistor network interconnecting the remaining conjugate terminals of said bridge rectifier circuit, the midterminal of said resistor network being connected to the midterminal of said transformer secondary and to a terminal of reference potential, a first pair of unidirectional conductive devices having respective terminals thereof connected to selected intermediate terminals of said resistor network on opposite sides of the midterminal thereof, said first pair of unidirectional conductive devices having their terminals remote from said resistor network connected to a first common junction, a second pair of unidirectional conductive devices having respective terminals thereof connected to selected intermediate terminals of said resistor network on opposite sides of the midterminal thereof other than the intermediate terminals to which said first pair of unidirectional conductive devices are connected, said second pair of unidirectional conductive devices having their terminals remote from said resistor network connected to a second common junction, all of said unidirectional conductive devices being poled to be non-conductive in the direction of the potential applied thereto by said resistor network, a source of alternating current having a terminal connected to said reference terminal, a first transformer having its primary connected between said first common junction and the remaining terminal of said alternating current source, a second transformer having its primary connected between said second common junction and said remaining terminal of said alternating current source, a circuit connecting the secondaries of said first and second transformers in series and means for deriving a functional signal therefrom.

References Cited in the file of this patent

UNITED STATES PATENTS

| | | |
|---|---|---|
| 2,697,201 | Harder | Dec. 14, 1954 |
| 2,773,233 | Marcks | Dec. 4, 1956 |
| 2,774,930 | Bixby | Dec. 18, 1956 |
| 2,810,107 | Sauber | Oct. 15, 1957 |
| 2,841,720 | Tellerman | July 1, 1958 |